United States Patent
Ha et al.

(10) Patent No.: US 10,998,715 B2
(45) Date of Patent: May 4, 2021

(54) PROTECTION APPARATUS

(71) Applicant: GENERAL ELECTRIC TECHNOLOGY GMBH, Baden (CH)

(72) Inventors: Hengxu Ha, Stafford (GB); Yang Lian, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 10 days.

(21) Appl. No.: 16/329,379

(22) PCT Filed: Aug. 10, 2017

(86) PCT No.: PCT/EP2017/070328
§ 371 (c)(1),
(2) Date: Feb. 28, 2019

(87) PCT Pub. No.: WO2018/041589
PCT Pub. Date: Mar. 8, 2018

(65) Prior Publication Data
US 2019/0199090 A1    Jun. 27, 2019

(30) Foreign Application Priority Data
Aug. 31, 2016 (EP) ..................................... 16186690

(51) Int. Cl.
*H02H 7/26* (2006.01)
*H02H 3/00* (2006.01)
(Continued)

(52) U.S. Cl.
CPC ............ *H02H 7/261* (2013.01); *H02H 3/006* (2013.01); *H02H 3/08* (2013.01); *H02H 3/40* (2013.01)

(58) Field of Classification Search
CPC .......... H02H 7/261; H02H 3/006; H02H 3/08; H02H 3/40
See application file for complete search history.

(56) References Cited

U.S. PATENT DOCUMENTS

2011/0282507 A1* 11/2011 Oudalov ................ H02H 3/006
700/292
2012/0259598 A1* 10/2012 Jandhyala ............ G06F 30/367
703/2
(Continued)

FOREIGN PATENT DOCUMENTS

CN           102403792 A      4/2012

OTHER PUBLICATIONS

European Search Report and Written Opinion dated Mar. 8, 2017 which was issued in connection with EP16186690.0 which was filed on Aug. 31, 2016.
(Continued)

*Primary Examiner* — Thomas C Lee
*Assistant Examiner* — Michael Tang
(74) *Attorney, Agent, or Firm* — Eversheds Sutherland (US) LLP (57) ABSTRACT

There is provided a protection apparatus for protecting an electrical network. The protection apparatus comprises: at least one protection device configured to protect the electrical network from a fault in response to a or a respective protection criterion being met; and a controller configured to: receive real-time information on a change in topological structure of the electrical network; perform an online determination of the real-time impedance or admittance matrix of the electrical network based on the change in topological structure of the electrical network; and adapt the or each protection criterion based on the real-time impedance or admittance matrix.

14 Claims, 3 Drawing Sheets

(51) Int. Cl.
 *H02H 3/08* (2006.01)
 *H02H 3/40* (2006.01)

(56) References Cited

U.S. PATENT DOCUMENTS

| | | | |
|---|---|---|---|
| 2014/0063669 A1* | 3/2014 | Lundqvist | H02H 3/30 361/79 |
| 2014/0229029 A1* | 8/2014 | Chu | H02J 13/0006 700/293 |
| 2014/0229127 A1* | 8/2014 | Ren | H02H 3/40 702/59 |
| 2014/0244065 A1* | 8/2014 | Biswas | H02J 3/06 700/298 |
| 2015/0346286 A1* | 12/2015 | Janssen | H02J 3/00 702/58 |
| 2016/0116522 A1 | 4/2016 | Abido et al. | |
| 2016/0190790 A1* | 6/2016 | Oudalov | H02H 3/08 361/66 |
| 2017/0025853 A1* | 1/2017 | Johansson | H02J 3/24 |
| 2017/0163029 A1* | 6/2017 | Hong | H02H 7/263 |

OTHER PUBLICATIONS

International Search Report and Written Opinion dated Nov. 17, 2017 which was issued in connection with PCT/EP2017/070328 which was filed on Aug. 10, 2017.

* cited by examiner

PROTECTION APPARATUS

FIELD OF INVENTION

This invention relates to a protection apparatus, and to a method of operating a protection apparatus.

BRIEF DESCRIPTION OF THE DISCLOSURE

It is known to use protection devices, such as circuit breakers and relays, which are operated in the event of a fault in order to protect an electrical network from the fault.

According to a first aspect of the invention, there is provided a protection apparatus for protecting an electrical network, the protection apparatus comprising:
 a. at least one protection device configured to protect the electrical network from a fault in response to a or a respective protection criterion being met; and
 b. a controller configured to: receive real-time information on a change in topological structure of the electrical network; perform an online determination of the real-time impedance or admittance matrix of the electrical network based on the change in topological structure of the electrical network; and adapt the or each protection criterion based on the real-time impedance or admittance matrix.

During the operation of the electrical network, the topological structure of the electrical network may change as a result of a change in condition of one or more components of the electrical network, such as an in-operation connection or disconnection of a component to or from the electrical network, a temporary or permanent removal of a component from the electrical network, and a temporary or permanent addition of a new component to or from the electrical network.

For example, the change in topological structure of the electrical network may include at least one of:
 a. a connection of at least one electrical source into the electrical network;
 b. a disconnection of at least one electrical source from the electrical network;
 c. a connection of at least one electrical load into the electrical network;
 d. a disconnection of at least one electrical load from the electrical network;
 e. a connection of at least one previously open electrical link of the electrical network;
 f. a disconnection of at least one previously closed electrical link of the electrical network;
 g. an increase or decrease in power of at least one connected electrical load or at least one connected electrical source of the electrical network.

An example of an electrical source is, but is not limited to, a distributed generator. An example of an electrical load is, but is not limited to, a bus or a feeder. The connection or disconnection of a previously open or closed electrical link may arise as a result of a change in switching state of an associated switching device (such as a relay, circuit breaker, and the like).

The controller may receive the real-time information on the change in topological structure of the electrical network from, for example, another controller, one or more sensors, and one or more components of the electrical network. The real-time information may relate to, for example, at least one electrical property of the electrical network, at least one electrical property of one or more components of the electrical network, and a switching state of at least one switching device.

Since the protection criterion of the or each protection device is designed on the basis of the previous topological structure of the electrical network prior to the occurrence of the change in topological structure of the electrical network, the change in the topological structure of the electrical network may lead to mal-operation or loss of the protection of the or each protection device as a result of the or each protection criterion not matching up with the new topological structure of the electrical network. Consequently the ability of the or each protection device to react appropriately to a fault would be adversely affected. For example, under such circumstances, the protection ability of the or each protection device may become active when it is not required to do so, or may remain inactive when it is required to do so.

In order to avoid the aforementioned mal-operation or loss of protection, the protection apparatus of the invention is designed to enable the dynamic and automatic adaptation of the protection criterion of the or each protection device in accordance with the change in the topological structure of the electrical network, which is particularly crucial when the topological structure of the electrical network changes frequently and/or unexpectedly. This in turn eliminates or minimises the exposure of the electrical network to the risk of mal-operation or loss of protection of the or each protection device.

In contrast, relying on an offline determination of the or each new protection criterion and manually updating the or each protection criterion may not match the variation of the topological structure of the electrical network or may not match the powers of the electrical loads and electrical sources and thereby runs a high risk of exposing the electrical network to mal-operation or loss of protection of the or each protection device. Also, it is impossible to perform the offline determination of the real-time impedance or admittance matrix and manual updating of the or each protection criterion for an electrical network with a topological structure that changes frequently and/or unexpectedly. This is because the or each protection criterion for an electrical network would normally be calculated offline based on a worst case scenario, and the or each offline-calculated protection criterion would then be fixed regardless of any change in the topological structure of the electrical network.

In addition the ability to dynamically and automatically adapt the protection criterion of the or each protection device in response to the change in the topological structure of the electrical network obviates the need to bring the or each protection device offline (which leaves the electrical network vulnerable to faults) in order to prevent mal-operation or loss of protection of the or each protection device.

Furthermore the use of the real-time impedance or admittance matrix conveys information about the new topological structure of the electrical network that permits determination of the or each new protection criterion in a time-efficient manner.

The provision of the controller in the protection apparatus of the invention therefore results in reliable and accurate protection for the electrical network.

In embodiments of the invention, the controller may be configured to adapt the or each protection criterion by determining an equivalent source voltage and/or an equivalent impedance or admittance seen by the or each protection device based on the real-time impedance or admittance matrix, and by determining the or each protection criterion based on the determined equivalent source voltage and/or equivalent impedance or admittance.

In such embodiments, the controller may be configured to adapt the or each protection criterion by determining an equivalent source voltage and/or an equivalent impedance or admittance seen by the or each protection device based on the real-time impedance or admittance matrix and on measured voltage and current of a part (e.g. a node) of the electrical network corresponding to the or each protection device, and by determining the or each protection criterion based on the determined equivalent source voltage and/or equivalent impedance or admittance.

Information about the new topological structure of the electrical network conveyed in the form of the equivalent source voltage and/or the equivalent impedance or admittance seen by the or each protection device enables ready determination of the or each new protection criterion.

The equivalent source voltage and the equivalent impedance or admittance are respectively the Thevenin equivalent source voltage and the Thevenin equivalent impedance or admittance.

In further embodiments of the invention, the controller may be configured to perform the online determination of the real-time impedance or admittance matrix of the electrical network by modifying a reference impedance or admittance matrix of the electrical network based on the change in topological structure of the electrical network so as to determine the real-time impedance or admittance matrix.

Modifying the reference impedance or admittance matrix results in a more time-efficient determination of the real-time impedance or admittance matrix, especially when the topological structure of the electrical network changes frequently and/or unexpectedly, when compared to determining the real-time impedance or admittance matrix without using a reference starting point.

The controller may be configured to receive information on the topological structure of the electrical network and to perform a determination of the reference impedance or admittance matrix prior to the change in topological structure of the electrical network. Configuring the controller in this manner permits automatic determination of the reference impedance or admittance matrix.

One way of determining the reference impedance or admittance matrix may be or may include the use of the branch addition method.

The determination of the reference impedance or admittance matrix may be an offline determination of the reference impedance or admittance matrix. Such offline determination by the controller may be carried out, for example, during installation of the electrical network or a new component of the electrical network, or when the electrical network is brought offline.

Alternatively, in other embodiments, the reference impedance or admittance matrix may be determined offline through other means, such as a controller or computer external to the electrical network, before the reference impedance or admittance matrix is provided as an input to the controller.

The reference impedance or admittance matrix may omit at least one electrical source of the electrical network and/or at least one electrical load of the electrical network. This simplifies the determination of the reference impedance or admittance matrix, since the electrical network may experience frequent and/or unexpected connection and disconnections of at least one electrical source and/or at least one electrical load.

In further embodiments of the invention, the controller may be configured to determine an equivalent impedance or admittance value of at least one component of the electrical network and to combine the or each equivalent impedance or admittance value into the reference impedance or admittance matrix by addition or subtraction so as to determine the real-time impedance or admittance matrix.

The modification of the reference impedance or admittance matrix in this manner provides a real-time impedance or admittance matrix that accurately reflects the current state of the topological structure of the electrical network.

The or each equivalent impedance or admittance value may be selected from a group including:

a. an equivalent load impedance or admittance of an electrical load of the electrical network;

b. an equivalent source impedance or admittance of an electrical source of the electrical network;

c. an equivalent impedance or admittance of an electrical link of the electrical network.

The controller may be configured in a variety of ways, examples of which are described as follows.

The controller may be a single control unit or may include a plurality of control units.

The controller may include a first control unit and at least one second control unit, the first control unit in communication with the or each second control unit. The or each second control unit may be associated with the or the respective protection device.

The first control unit may be a higher level controller, such as a substation level controller.

The first control unit and/or the or each second control unit may also be in communication with one or more other control units, for example, a global controller.

The first control unit may be configured to: receive real-time information about a part of the electrical network corresponding to the or each protection device from the or each second control unit; and perform the online determination of the real-time impedance or admittance matrix based on the received real-time information from the or each second control unit. The real-time information from the or each second control unit may relate to, for example, electrical properties of the or each protection device, such as current and voltage, and a switching state of the or each protection device.

In such embodiments, the first control unit may be configured to transmit the real-time impedance or admittance matrix to the or each second control unit, and the or each second control unit may be configured to adapt the or each protection criterion based on the real-time impedance or admittance matrix.

Determining the real-time impedance or admittance matrix using the first control unit and adapt the or each protection criterion using the or each second control unit in this manner enables the determination of the real-time impedance or admittance matrix and the adaptation of the or each protection criterion to be performed on different levels. This in turn permits a reduction in the dimension of the real-time impedance or admittance matrix, which improves the reliability efficiency of the controller in carrying out its various tasks.

Dividing the tasks of determining the real-time impedance or admittance matrix and adapting the or each protection criterion between the first and second control units in the foregoing manner can be particularly effective when there are a high number of protection devices and therefore a high number of second control units, or when the invention is used for an electrical network with a large and/or a complex topology.

In still further embodiments of the invention, the or each protection device may be or may include an overcurrent relay, and the or each protection criterion may be or may include a fault level of a circuit interruption device (e.g. a circuit breaker) associated with the overcurrent relay and/or a setting value of the overcurrent relay. The invention is particularly applicable to an overcurrent relay, since the fault level of a circuit interruption device associated with the overcurrent relay and/or a setting value of the overcurrent relay can be affected by a change in topological structure of the electrical network.

In even still further embodiments of the invention, the or each protection device may be or may include a distance protection relay, and the or each protection criterion may be or may include a reach setting value of the distance protection relay. The invention is particularly applicable to a distance protection relay, since the accuracy of the reach setting value of the distance protection relay can be affected by a change in topological structure of the electrical network.

According to a second aspect of the invention, there is provided a method of operating a protection apparatus for protecting an electrical network, the protection apparatus comprising at least one protection device configured to protect the electrical network from a fault in response to a or a respective protection criterion being met, the method including the steps of:

a. receiving real-time information on a change in topological structure of the electrical network;

b. performing an online determination of the real-time impedance or admittance matrix of the electrical network based on the change in topological structure of the electrical network; and c. adapting the or each protection criterion based on the real-time impedance or admittance matrix.

The advantages of the protection apparatus of the first aspect of the invention and its embodiments apply mutatis mutandis to the method of the second aspect of the invention and its embodiments.

In the method of the invention, the change in topological structure of the electrical network may include at least one of:

a. a connection of at least one electrical source into the electrical network;

b. a disconnection of at least one electrical source from the electrical network;

c. a connection of at least one electrical load into the electrical network;

d. a disconnection of at least one electrical load from the electrical network;

e. a connection of at least one previously open electrical link of the electrical network;

f. a disconnection of at least one previously closed electrical link of the electrical network.

g. an increase or decrease in power of at least one connected electrical load or at least one connected electrical source of the electrical network.

The method of the invention may include the step of adapting the or each protection criterion by determining an equivalent source voltage and/or an equivalent impedance or admittance seen by the or each protection device based on the real-time impedance or admittance matrix, and by determining the or each protection criterion based on the determined equivalent source voltage and/or equivalent impedance or admittance.

The method of the invention may further include the step of adapting the or each protection criterion by determining an equivalent source voltage and/or an equivalent impedance or admittance seen by the or each protection device based on the real-time impedance or admittance matrix and on measured voltage and current of a part (e.g. a node) of the electrical network corresponding to the or each protection device, and by determining the or each protection criterion based on the determined equivalent source voltage and/or equivalent impedance or admittance.

In the method of the invention, the equivalent source voltage and the equivalent impedance or admittance may be respectively the Thevenin equivalent source voltage and the Thevenin equivalent impedance or admittance.

The method of the invention may further include the step of performing the online determination of the real-time impedance or admittance matrix of the electrical network by modifying a reference impedance or admittance matrix of the electrical network based on the change in topological structure of the electrical network so as to determine the real-time impedance or admittance matrix.

The method of the invention may further include the steps of: receiving information on the topological structure of the electrical network and performing a determination of the reference impedance or admittance matrix prior to the change in topological structure of the electrical network.

In the method of the invention, the determination of the reference impedance or admittance matrix may be an offline determination of the reference impedance or admittance matrix.

In the method of the invention, the reference impedance or admittance matrix may omit at least one electrical source of the electrical network and/or at least one electrical load of the electrical network.

The method of the invention may further include the steps of: determining an equivalent impedance or admittance value of at least one component of the electrical network; and combining the or each equivalent impedance or admittance value into the reference impedance or admittance matrix by addition or subtraction so as to determine the real-time impedance or admittance matrix.

The or each equivalent impedance or admittance value may be selected from a group including:

a. an equivalent load impedance or admittance of an electrical load of the electrical network;

b. an equivalent source impedance or admittance of an electrical source of the electrical network;

c. an equivalent impedance or admittance of an electrical link of the electrical network.

In the method of the invention, the or each protection device may be or may include an overcurrent relay, and the or each protection criterion may be or may include a fault level of a circuit interruption device (e.g. a circuit breaker) associated with the overcurrent relay and/or a setting value of the overcurrent relay.

In the method of the invention, the or each protection device may be or may include a distance protection relay, and the or each protection criterion may be or may include a reach setting value of the distance protection relay.

BRIEF DESCRIPTION OF THE DRAWINGS

An embodiment of the invention will now be described, by way of a non-limiting example, with reference to the accompanying figures in which.

DETAILED DESCRIPTION

The figures are not necessarily to scale, and certain features and certain views of the figures may be shown exaggerated in scale or in schematic form in the interests of clarity and conciseness.

Figure 1:
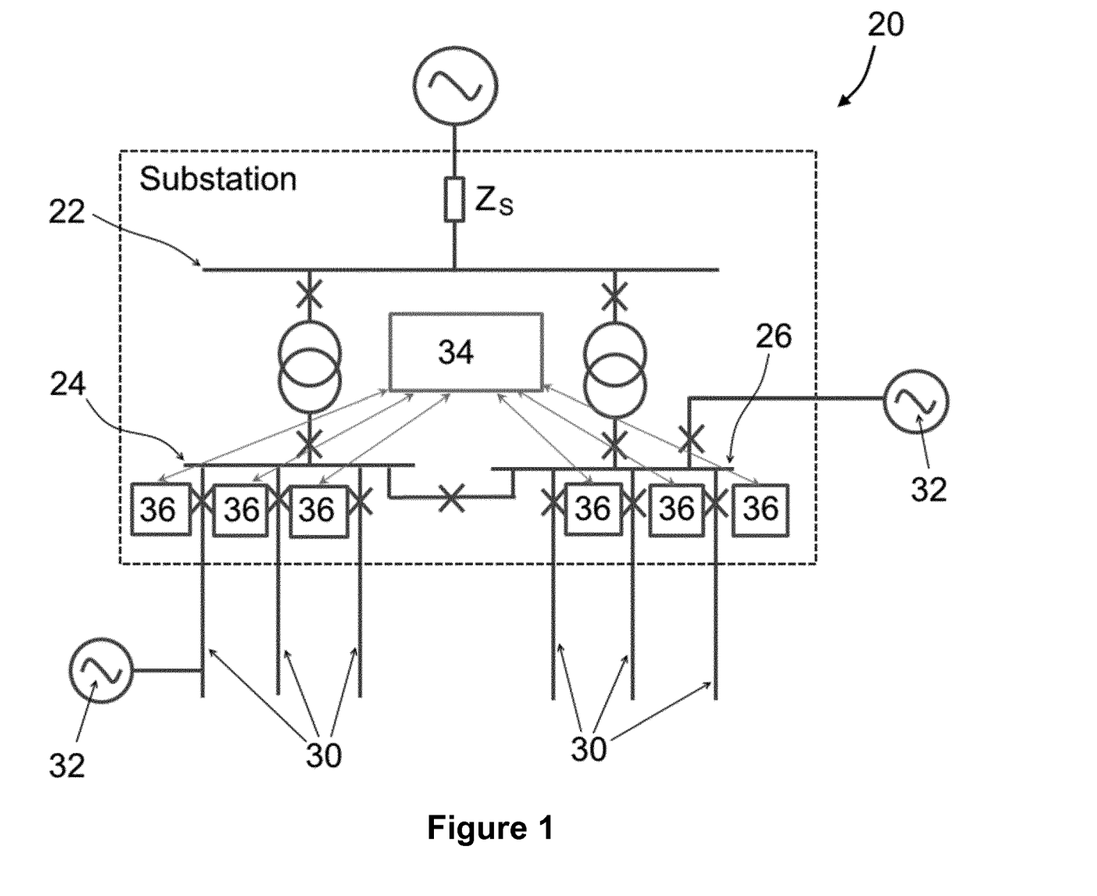
FIG. 1 schematically shows an electrical network which includes a protection apparatus according to an embodiment of the invention.

An electrical network 20 is shown in FIG. 1 and is designated generally by the reference numeral 20.

The electrical network 20 includes a substation with first, second and third buses 22, 24, 26. The first bus 22 is connected to a higher level section of the electrical network 20 (such as a power transmission section) which is depicted by an equivalent source voltage and system impedance $Z_s$. The first bus 22 is connected to the second bus 24 via a transformer, and the first bus 22 is also connected to the third bus 26 via another transformer. Respective breakers are connected on both sides of each transformer. The second and third buses 24, 26 are interconnected via an electrical link that includes a breaker.

A plurality of feeders 30 extends from the second bus 24, and a distributed generator 32 is connected to one of the feeders 30 extending from the second bus 24. Another plurality of feeders 30 extends from the third bus 26, and another distributed generator 32 is connected via a breaker to the third bus 26.

A respective protection device is connected in each feeder 30. In the embodiment shown, each protection device is in the form of an overcurrent relay, which is configured to operate an associated breaker to switch to an open state to disconnect the corresponding feeder 30 in the event of an overcurrent resulting in its protection criterion being met. The configuration of each overcurrent relay in this way enables it to protect the corresponding feeder 30 from the overcurrent.

Figure 2:
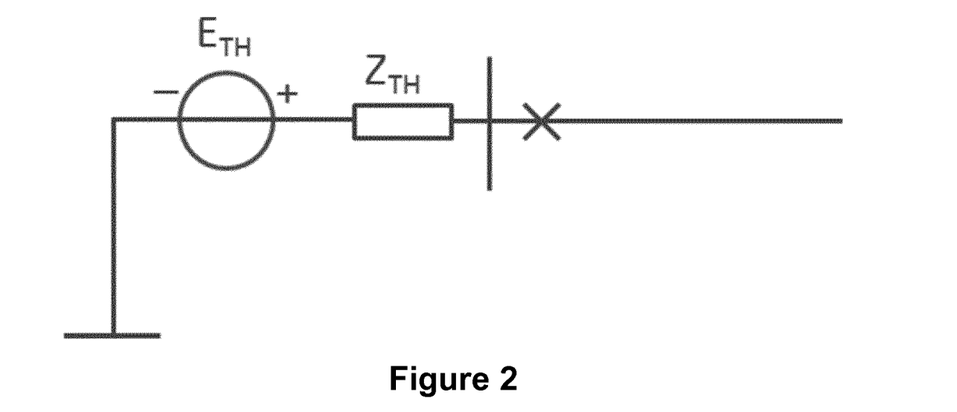
FIG. 2 schematically shows the equivalent source voltage and the equivalent impedance seen by a protection device of the electrical network of FIG. 1.

Each protection criterion, i.e. the fault level of the breaker associated with each overcurrent relay and the setting value of each overcurrent relay, is calculated from the equivalent source voltage $E_{TH}$ and the equivalent impedance $Z_{TH}$ of the electrical network 20 as seen by each overcurrent relay. FIG. 2 schematically shows the Thevenin equivalent source voltage $E_{TH}$ and the Thevenin equivalent impedance $Z_{TH}$ seen by a protection device of the electrical network 20 of FIG. 1.

For each feeder 30, the fault level $I_{FL}$ of each breaker associated with a respective overcurrent relay is calculated as $I_{FL}=E_{TH}/Z_{TH}$, while the setting value $I_{set}$ of each overcurrent relay is calculated as $I_{set}=1.2*E_{th}/(Z_{TH}+Z_L)$, where $Z_L$ is the overall impedance of the corresponding feeder 30. It will be appreciated that the coefficient of 1.2 for the setting value $I_{set}$ calculation may be replaced by another coefficient of a different value.

However, during the operation of the electrical network 20, the equivalent source voltage and the equivalent impedance of the electrical network 20 as seen by each overcurrent relay may change due to a change in topological structure of the electrical network 20. For example, the change in topological structure of the electrical network 20 may include at least one of: a connection or disconnection of at least one distributed generator 32 into or from the electrical network 20; a connection or disconnection of at least one feeder 30 into or from the electrical network 20; a connection of at least one previously open electrical link of the electrical network 20 due to the closing of an associated breaker; a disconnection of at least one previously closed electrical link of the electrical network 20 due to the opening of an associated breaker; an increase or decrease in power of at least one connected feeder 30 or at least one connected distributed generator 32 of the electrical network 20.

The change in the equivalent source voltage $E_{TH}$ and the equivalent impedance $Z_{TH}$ of the electrical network 20 as seen by a given overcurrent relay means that the corresponding protection criterion no longer matches the new topological structure of the electrical network 20, which could lead to mal-operation or loss of protection of the or each protection device. This in turn leaves the electrical network 20 vulnerable to overcurrents, and adversely affects the performance of each protection device.

The protection apparatus further includes a controller. The controller includes a first control unit, which is in the form of a central control unit 34, and a plurality of second control units, which is in the form of a distributed control unit 36. Each distributed control unit 36 is associated with a respective one of the overcurrent relays.

Figure 3:
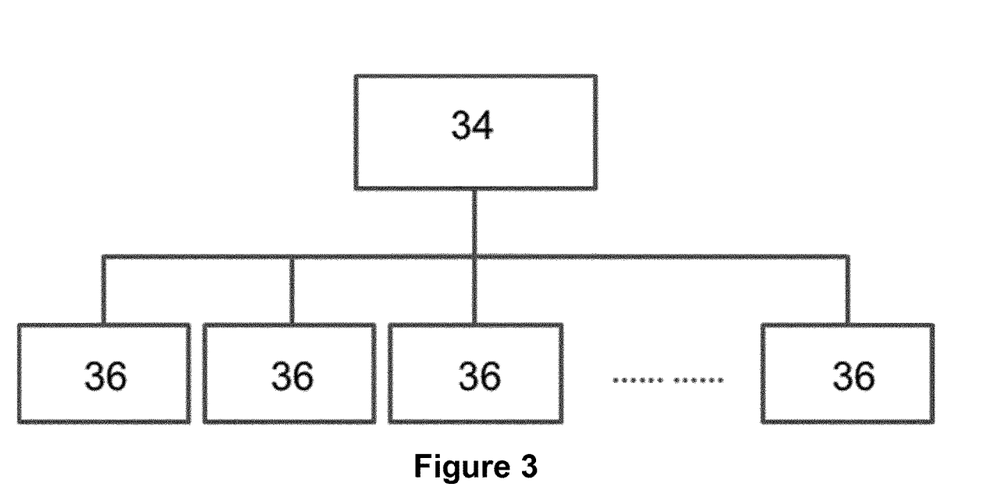
FIG. 3 schematically show a layout of a controller of the protection apparatus of FIG. 1.

As shown in FIG. 3, the central control unit 34 is in communication with each of the distributed control units 36. In this way the central control unit 34 can obtain real-time information from each distributed control unit 36 and transmit information back to each distributed control unit 36, while each distributed control unit 36 can obtain real-time information about the corresponding overcurrent relay and feeder 30 and provide the obtained real-time information to the central control unit 34. Each distributed control unit 36 is configured to set the protection criterion of the corresponding overcurrent relay.

The controller is configured to enable the dynamic and automatic adaptation of each protection criterion in response to the change in topological structure of the electrical network 20. Such configuration of the controller is described as follows, with reference to FIGS. 3 to 6.

Initially a reference impedance matrix $Z_{M0}$ is formulated using the branch addition method. The loads and the distributed generators 32 connected on the buses 24, 26 are accounted in the formulation of the reference impedance matrix $Z_{M0}$. The formulation of the reference impedance matrix $Z_{M0}$ is performed offline, and then provided as an input to the central control unit 34.

Figure 4:
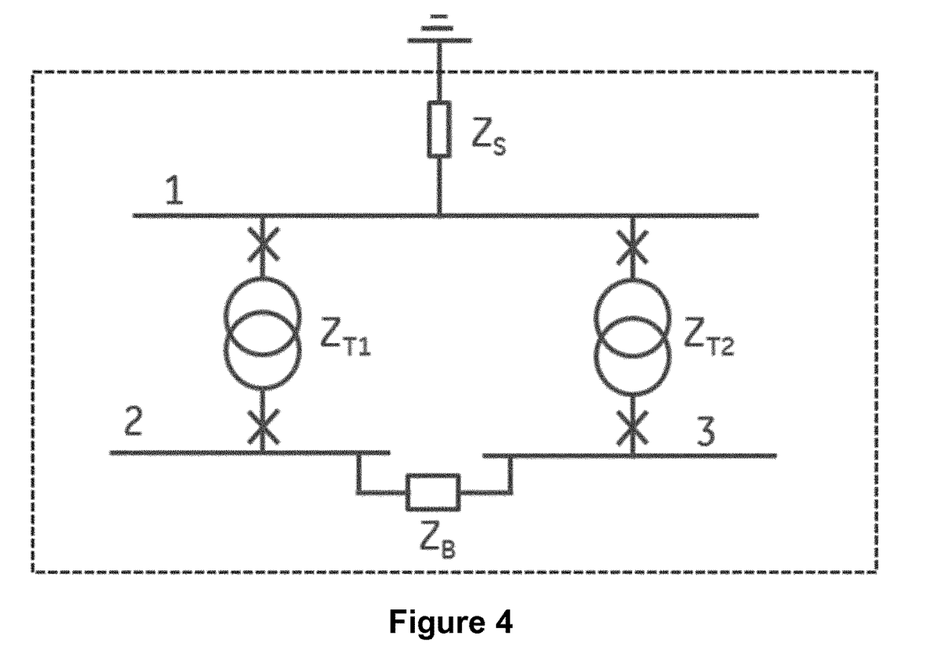
FIG. 4 illustrates the determination of a reference impedance matrix of the electrical network of FIG. 1 using the branch addition method.

FIG. 4 illustrates the determination of a reference impedance matrix $Z_{M0}$ of the electrical network 20 of FIG. 1 using the branch addition method.

The buses 22, 24, 26 in the electrical network 20 are numbered as 1, 2 and 3.

The branch impedance of an arbitrary grounded branch connected to the $1^{st}$ bus 22 is added to the reference impedance matrix $Z_{M0}$ so that $Z_{M0}=[Zs]$. k is then set as 1.

This is followed by a so-called "branch addition" step of adding another branch connected with the $k^{th}$ bus and the $n^{th}$ bus (assuming that the branch impedance is $z_{kn}$) into the previous reference impedance matrix $Z_{M0}$.

If the $n^{th}$ bus is a new bus, then the reference impedance matrix $Z_{M0}$ will increase by a row and a column (assume that the dimension of the reference impedance matrix $Z_{M0}$ is $(n-1)*(n-1)$), in which:

a. the elements of the $n^{th}$ column are given by:

$$Z_{M0}[i][n]=Z_{M0}[i][k] \; (i=1,2,\ldots,n-1) \tag{1}$$

a. the elements of the $n^{th}$ row are given by:

$$Z_{M0}[n][i]=Z_{M0}[k][i] \; (i=1,2,\ldots,n-1) \tag{2}$$

the element of the $n^{th}$ row and $n^{th}$ column is given by:

$$Z_{M0}[n][n]=Z_{M0}[k][k]+z_{kn} \tag{3}$$

When adding the branch between the $1^{st}$ and $2^{nd}$ buses 22, 24 to the reference impedance matrix $Z_{M0}$ in [2], in which the branch impedance of branch between the $1^{st}$ and $2^{nd}$ buses 22, 24 is $Z_{T1}$, the reference impedance matrix $Z_{M0}$ becomes:

$$Z_{M0} = \begin{bmatrix} z_0 & z_0 \\ z_0 & z_0+z_{T1} \end{bmatrix} \tag{4}$$

When adding the branch between the $2^{nd}$ and $3^{rd}$ buses 24, 26 to the reference impedance matrix $Z_{M0}$ in [4], in which the branch impedance of branch between the $2^{nd}$ and $3^{rd}$ buses 24, 26 is $Z_{T2}$, the reference impedance matrix $Z_{M0}$ becomes:

$$Z_{M0} = \begin{bmatrix} z_0 & z_0 & z_0 \\ z_0 & z_0+z_{T1} & z_0 \\ z_0 & z_0 & z_0+z_{T2} \end{bmatrix} \tag{5}$$

If the $k^{th}$ bus and the $n^{th}$ bus are existing buses in the prior reference impedance matrix $Z_{M0}$, it means that the corresponding branch is an electrical link. Hence, the dimension of the new reference impedance matrix $Z_{M0}$ is the same as the prior reference impedance matrix $Z_{M0}$. The elements of the new reference impedance matrix $Z_{M0}$ will be given by:

$$Z_{M0New}[i][j] = \tag{6}$$
$$Z_{m0}[i][j] + \frac{(Z_{M0}[i][n]-Z_{M0}[i][k])(Z_{M0}[k][j]-Z_{M0}[n][j])}{Z_{M0}[k][k]+Z_{M0}[n][n]-2Z_{M0}[k][n]+z_{kn}}$$

If one bus of the branch is an existing bus, and another bus of the branch is ground, then the branch is a grounded electrical link. This means that the dimension of the new reference impedance matrix $Z_{M0}$ is the same as the prior reference impedance matrix $Z_{M0}$. The elements of the new reference impedance matrix $Z_{M0}$ will be given by:

$$Z_{M0New}[i][j] = Z_{M0}[i][j] - \frac{Z_{M0}[i][k]Z_{M0}[k][j]}{Z_{M0}[k][k]+z_{kn}} \tag{7}$$

The above "branch addition" step is repeated until all of the branches of the electrical network 20 are added to the reference impedance matrix $Z_{M0}$.

Figure 5:
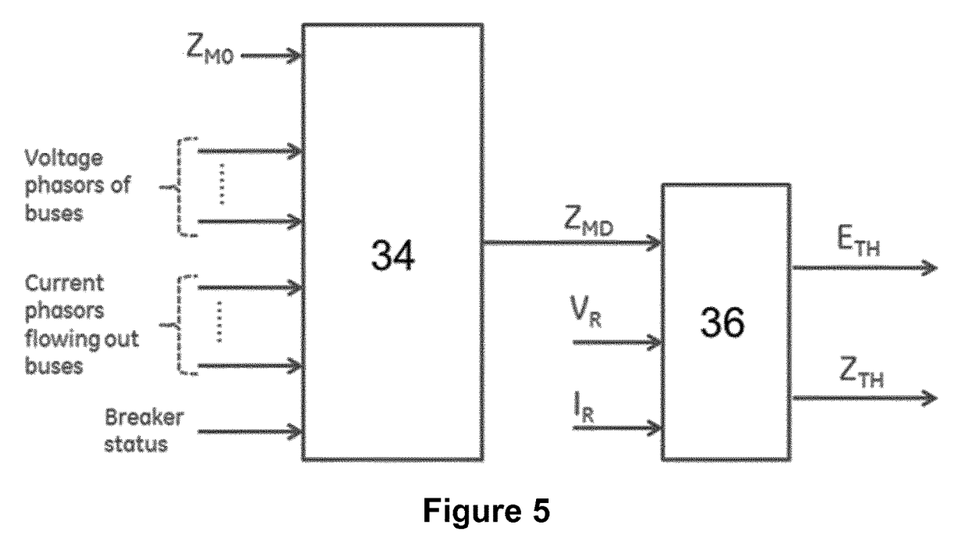
FIGS. 5 and 6 illustrates the determination of a real-time impedance matrix of the electrical network of FIG. 1.
Figure 6:
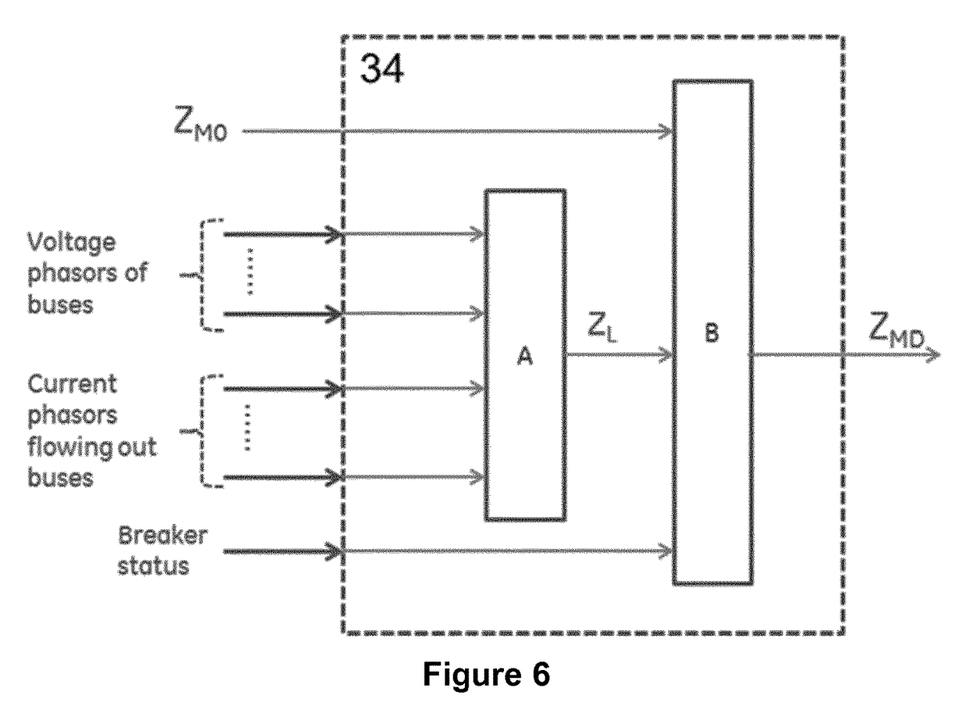

Next, the central unit receives the reference impedance matrix $Z_{M0}$ and uses the reference impedance matrix $Z_{M0}$ to perform an online determination of a real-time impedance matrix $Z_{MD}$ of the electrical network 20 based on the change in topological structure of the electrical network 20. In particular, the online determination of the real-time impedance matrix $Z_{MD}$ involves the modification of the reference impedance matrix $Z_{M0}$ to take into account based on the change in topological structure of the electrical network 20.

The modification of the reference impedance matrix $Z_{M0}$ to determine the real-time impedance matrix $Z_{MD}$ is performed as follows:

The equivalent load impedance of the electrical load at each of the second and third buses 24, 26 is calculated (shown by block A of the central control unit 34 in FIG. 6). The equivalent load impedance of the $k^{th}$ bus equals the voltage phasor of the $k^{th}$ bus divided by all the current phasors flowing out from the $k^{th}$ bus, and is given by:

$$Z_L[k] = \frac{U[k]}{\sum_{j \in k} I[j]} \tag{8}$$

The voltage and current phasors are based on the voltages and currents measured by the distributed control units 36 and sent to the central control unit 34.

Then the equivalent load impedance of the $k^{th}$ bus is added to the reference impedance matrix $Z_{M0}$ as follows (shown by block B of the central control unit 34 in FIG. 6):

$$Z_{MNew}[i][j] = Z_{M0}[i][j] - \frac{Z_{M0}[i][k]Z_{M0}[k][j]}{Z_{M0}[k][k]+z_L[k]} \tag{9}$$

If an electrical link is disconnected from the electrical network 20, the information about the disconnection of the electrical link can be obtained from the status of the corresponding breaker(s). For example, if the branch between the first and second buses 22, 24 is disconnected (where the impedance of this branch is $Z_{T1}$), such disconnection means that an equivalent impedance value of $-Z_{T1}$ is effectively added between the first and second buses. So, if the branch between the $k^{th}$ and $n^{th}$ buses is disconnected, the modification of the reference impedance matrix $Z_{M0}$ is given by:

$$Z_{MNew}[i][j] = \tag{10}$$
$$Z_{M0}[i][j] + \frac{(Z_{M0}[i][n]-Z_{M0}[i][k])(Z_{M0}[k][j]-Z_{M0}[n][j])}{Z_{M0}[k][k]+Z_{M0}[n][n]-2Z_{M0}[k][n]-z_{kn}}$$

After the online determination of the real-time impedance matrix $Z_{MD}$, the central control unit 34 then transmits the real-time impedance matrix $Z_{MD}$ to each distributed control unit 36. Thereafter, each distributed control calculates the equivalent source voltage $E_{TH}$ and the equivalent impedance $Z_{TH}$ seen by the corresponding overcurrent relay using the real-time impedance matrix and the measured voltage and current of the corresponding feeder 30.

The calculation of the equivalent source voltage $E_{TH}$ and the equivalent impedance $Z_{TH}$ seen by the corresponding overcurrent relay can be performed using two methods, which are shown as follows.

Method I:

Firstly the equivalent load impedance of the feeder 30 is given by:

$$Z_{Feeder} = \frac{V_R}{I_R} \tag{11}$$

Wherein $V_R$ and $I_R$ are the measured voltage and current of the corresponding feeder 30.

Next, a value of $-Z_{Feeder}$ is added to the real-time impedance matrix $Z_{MD}$, which was received from the central control, as shown by:

$$Z_{MDNew}[i][j] = Z_{MD}[i][j] - \frac{Z_{MD}[i][k]Z_{MD}[k][j]}{Z_{MD}[k][k] - z_{Feeder}} \quad [12]$$

In [12], the feeder 30 is connected on the $k^{th}$ bus.

Finally the equivalent source voltage $E_{TH}$ and the equivalent impedance $Z_{TH}$ are given by:

$$Z_{TH} = Z_{MDNew}[k][k] \quad [13]$$

$$E_{TH} = V_R + Z_{TH} I_R \quad [14]$$

Method II:

Firstly the equivalent load impedance of the feeder 30 is obtained using [11] of Method I above.

Next, an equivalent injection current into the $k^{th}$ bus is given by:

$$I_{Ink} = \frac{V_R}{Z_{MD}[k][k] - z_{Feeder}} \quad [15]$$

In [15], the feeder 30 is connected on the $k^{th}$ bus.

Finally the equivalent source voltage $E_{TH}$ and the equivalent impedance $Z_{TH}$ are given by:

$$E_{TH} = Z_{MD} \begin{bmatrix} 0 \\ \ldots \\ -I_{Ink} \\ \ldots \\ 0 \end{bmatrix} + V_R \quad [16]$$

$$Z_{TH} = \frac{E_{TH} - V_R}{I_R} \quad [17]$$

The determination of the equivalent source voltage $E_{TH}$ and the equivalent impedance $Z_{TH}$ seen by the corresponding overcurrent relay allows each distributed control unit 36 to calculate the new protection criterion of the corresponding overcurrent relay and then update the protection criterion for the corresponding overcurrent relay.

In this manner the protection criterion for each overcurrent relay is adapted to correspond to the new topological structure of the electrical network 20, thus avoiding the mal-operation or loss of protection of the overcurrent relays.

It will be appreciated that the topology of the electrical network 20 of FIG. 1 is merely chosen to help illustrate the working of the invention, and the invention is applicable to electrical networks with other topologies.

It will also be appreciated that the overcurrent relays of the electrical network 20 of FIG. 1 is merely chosen to help illustrate the working of the invention, and the invention is applicable to other types of protection devices.

For example, a given protection device may be in the form of a distance protection relay, where the relevant protection criterion may be or may include a reach setting value of the distance protection relay. Following a change in the topological structure of the electrical network 20, the reach setting value may be updated based on the equivalent impedance $Z_{TH}$ seen by the distance protection relay. By updating the reach setting value, this ensures that the desired distance protection zone of the distance protection relay accurately corresponds to the new topological structure of the electrical network 20, and thereby avoids over-reach or under-reach of the distance protection zone of the distance protection relay. Otherwise, if the reach setting value of the distance protection relay is not updated following a change in the topological structure of the electrical network 20, the accuracy of the protection operation of the distance protection relay may be adversely affected by an expansion or deflation of the actual distance protection zone.

What we claim is:

1. A protection apparatus for protecting an electrical network, the protection apparatus comprising:
at least one protection device configured to protect the electrical network from a fault in response to a or a respective protection criterion being met; and a controller configured to:
receive real-time information on a change in topological structure of the electrical network;
perform an online determined real-time impedance or admittance matrix of the electrical network based on the change in topological structure of the electrical network; and
send this real-time impedance or admittance matrix to the or each protection device, and the or each protection device is configured to adapt the or each protection criterion based on the real-time impedance or admittance matrix.

2. The protection apparatus according to claim 1, wherein the change in topological structure of the electrical network includes at least one of:
a connection of at least one electrical source into the electrical network; a disconnection of at least one electrical source from the electrical network; a connection of at least one electrical load into the electrical network; a disconnection of at least one electrical load from the electrical network; a connection of at least one previously open electrical link of the electrical network; a disconnection of at least one previously closed electrical link of the electrical network; an increase or decrease in power of at least one connected electrical load or at least one connected electrical source of the electrical network.

3. The protection apparatus according to claim 1, wherein the controller is configured to calculate the real-time impedance or admittance matrix by adding or subtracting a branch of impedance or admittance into an original reference impedance or admittance matrix based on the real-time measured voltages and currents, and on the information of a change in topological structure of electric network.

4. The protection apparatus according to claim 3, wherein the protection device is configured to adapt the or each protection criterion by determining an equivalent source voltage and/or an equivalent impedance or admittance seen by the or each protection device based on the real-time impedance or admittance matrix, which is from the controller, and on measured voltage and current of a part of the electrical network corresponding to the or each protection device, and by determining the or each protection criterion based on the determined equivalent source voltage and/or equivalent impedance or admittance.

5. The protection apparatus according to claim 3, wherein the equivalent source voltage and the equivalent impedance or admittance are respectively the Thevenin's equivalent source voltage and the Thevenin's equivalent impedance or admittance.

6. The protection apparatus according to claim 3, wherein the controller is configured to receive information on the topological structure of the electrical network and to perform a determination of the reference impedance or admittance matrix prior to the change in topological structure of the electrical network.

7. The protection apparatus according to claim 6, wherein the determination of the reference impedance or admittance matrix is an offline determination of the reference impedance or admittance matrix.

8. The protection apparatus according to claim 6, wherein the reference impedance or admittance matrix omits some or all the electrical sources of the electrical network and/or some or all the electrical loads of the electrical network.

9. The protection apparatus according to claim 1, wherein the controller is configured to determine a branch impedance or admittance value of at least one component of the electrical network and to combine the or each equivalent impedance or admittance value into the reference impedance or admittance matrix by addition or subtraction so as to determine the real-time impedance or admittance matrix.

10. The protection apparatus according to claim 9, wherein the or each branch impedance or admittance value is selected from a group including:
   an equivalent load impedance or admittance of an electrical load of the electrical network;
   an equivalent source impedance or admittance of an electrical source of the electrical network;
   an equivalent impedance or admittance of an electrical link of the electrical network.

11. The protection apparatus according to claim 1, wherein the controller communicate with the or each protection device wherein the controller is configured to: receive real-time information about a part of the electrical network corresponding to the or each protection device; and perform the online determination of the real-time impedance or admittance matrix based on the received real-time information from the or each protection device.

12. The protection apparatus according to claim 11, wherein the controller is configured to transmit the real-time impedance or admittance matrix to the or each protection device, and the or each protection device is configured to adapt the or each protection criterion based on the real-time impedance or admittance matrix.

13. The protection apparatus according to claim 1, wherein the or each protection device is or includes an overcurrent relay, and the or each protection criterion is or includes a fault level of a circuit interruption device associated with the overcurrent relay and/or a setting value of the overcurrent relay, or wherein the or each protection device is or includes a distance protection relay, and the or each protection criterion is or includes a reach setting value of the distance protection relay.

14. A method of operating a protection apparatus for protecting an electrical network, the protection apparatus comprising at least one protection device configured to protect the electrical network from a fault in response to a or a respective protection criterion being met; and a controller configured to: receive real-time information on a change in topological structure of the electrical network; perform an on-line determined real-time impedance or admittance matrix;
   the method comprising:
   receiving the real time information on a change in topological of the electrical network, and the measuring of voltages and currents of all the branches;
   performing a determination of the real-time impedance or admittance matrix based on the information of topological structure change and the measuring of voltages and currents; and
   transmitting the determined impedance or admittance matrix to the or each protection device, and the or each protection device is configured to adapt the or each protection criterion based on the real-time impedance or admittance matrix.

* * * * *